United States Patent
Zhu et al.

(10) Patent No.: US 12,402,069 B2
(45) Date of Patent: Aug. 26, 2025

(54) METHOD FOR SLICE INFORMATION UPDATE

(71) Applicant: ZTE Corporation, Guangdong (CN)

(72) Inventors: Jinguo Zhu, Guangdong (CN); Shuang Liang, Guangdong (CN); Fei Lu, Guangdong (CN)

(73) Assignee: ZTE Corporation, Guangdong (CN)

( * ) Notice: Subject to any disclaimer, the term of this patent is extended or adjusted under 35 U.S.C. 154(b) by 418 days.

(21) Appl. No.: 18/045,303

(22) Filed: Oct. 10, 2022

(65) Prior Publication Data

US 2023/0054991 A1 Feb. 23, 2023

Related U.S. Application Data

(63) Continuation of application No. PCT/CN2020/084087, filed on Apr. 10, 2020.

(51) Int. Cl.
*H04W 48/16* (2009.01)
(52) U.S. Cl.
CPC .................... *H04W 48/16* (2013.01)
(58) Field of Classification Search
CPC ..... H04W 76/11; H04W 76/10; H04W 48/18; H04W 84/042
See application file for complete search history.

(56) References Cited

U.S. PATENT DOCUMENTS

| 10,939,276 B2 * | 3/2021 | Zhu | H04W 8/06 |
| 2018/0270877 A1 | 9/2018 | Lee et al. | |

FOREIGN PATENT DOCUMENTS

| WO | WO 2018/167307 A1 | 9/2018 |
| WO | WO 2018/176391 A1 | 10/2018 |
| WO | WO 2018/208371 A1 | 11/2018 |
| WO | WO 2019/001576 A1 | 1/2019 |
| WO | WO 2019/137471 A1 | 7/2019 |

OTHER PUBLICATIONS

First Examination Report received for India Application No. 202227056529 mailed Mar. 1, 2024 (7 pages).
International Search Report and Written Opinion received for Application No. PCT/CN2020/084087 mailed Jan. 4, 2021 (7 pages).
Huawei et al., "What is RAN Part of a Network Slice?," 3GPP TSG-RAN WG2#99bis R2.1710222, Oct. 13, 2017 (5 pp.).
European Search Report received for European Application No. 20895540.1 dated Dec. 4, 2023 (10 pages).
(Continued)

*Primary Examiner* — Diane D Mizrahi
(74) *Attorney, Agent, or Firm* — Crowell & Moring LLP

(57) ABSTRACT

An access and mobility management function (AMF) is modified with network slice information. First requested network slice information of a protocol data unit session is received from a wireless terminal. Second requested network slice information is generated based on the first requested network slice information of the PDU session and supported network slice information of a radio access network node of the wireless terminal.

14 Claims, 8 Drawing Sheets

(56) References Cited

OTHER PUBLICATIONS

ZTE: "FS_eNS_Ph3 New Solution to KI #I", 3GPP Draft; S2-2202668, 3rd Generation Partnership Project (3GPP), Mobile Competence Centre; 650, Route Des Lucioles; F-06921 Sophia-Antipolis Cedex; France, vol. SA WG2, No. e-meeting; Apr. 6, 2022-Apr. 10, 2022, Mar. 29, 2022, XP052133503, Retrieved from the Internet: URL:https://ftp.3gpp.org/tsg_sa/WG2_Arch/T (2 pp.).
Office Action issued for China Patent Application No. 202080099555.X dated Mar. 30, 2025, and English translation (12 pp.).
Office Action issued for the China Patent Application No. 202080099555.X dated Sep. 26, 2024, and English translation (17 pages).

* cited by examiner

METHOD FOR SLICE INFORMATION UPDATE

PRIORITY

This application claims priority as a Continuation of PCT/CN2020/084087, filed on Apr. 10, 2020, entitled "A METHOD FOR SLICE INFORMATION UPDATE", published as WO 2021/109395 A1, the entirety of which is incorporated herein by reference.

TECHNICAL FIELD

This document is directed generally to wireless communications, in particular to new radio communications, more particularly to 5G communications.

BACKGROUND

In the beginning, several terminologies are illustrated as the following:

Network slice: A logical network that provides specific network capabilities and network characteristics.

Network slice instance: A set of network function instances and the required resources (e.g. compute, storage and networking resources) which form a deployed network slice.

A network slice selection assistance information (NS-SAI): The NSSAI includes one or a list of single NSSAI(s) (S-NSSAI). The S-NSSAI is configured to identify a network slice and comprises:
- a slice/service type (SST), which refers to expected network slice behavior(s) in terms of features and services; and
- a slice differentiator (SD), which is optional information that complements the Slice/Service type(s) to differentiate amongst multiple network slices of the same slice/service type.

In addition, single or multiple S-NSSAI may be used to identify a single network slice instance.

Configured NSSAI: An NSSAI provisioned in a user equipment (UE) applicable to one or more public land mobile networks (PLMNs).

Requested NSSAI: An NSSAI provided by the UE to a serving PLMN, e.g., during a registration procedure or a PDU session establishment procedure.

Allowed NSSAI: An NSSAI provided by the serving PLMN during, e.g., the registration procedure and is configured to indicate S-NSSAI values which can be used by the UE in the serving PLMN for a current registration area of the UE.

SUMMARY

Generally speaking, the S-NSSAI in the allowed NSSAI is assumed to be valid for all the cells under a current registered registration area (e.g. a tracking area list) of the UE. However, this assumption puts a lot of restrictions on network slice deployment. Within a single tracking area, a network operator may need to deploy different network slices for different cells.

The present disclosure provides methods, systems, and devices for supporting different network slices under different cells with the same tracking area.

The present disclosure relates to a wireless communication method for use in an access and mobility management function (AMF). The wireless communication method comprises:

receiving, from a wireless terminal, first requested network slice information of a protocol data unit (PDU) session, generating second requested network slice information based on the first requested network slice information of the PDU session and supported network slice information of a radio access network (RAN) node of the wireless terminal, and transmitting, to a session management function (SMF) the second requested network slice information.

Various embodiments may implement the following features:

In some embodiments, the RAN node does not support the first requested network slice information.

In some embodiments, the second requested network slice information comprises the first requested network slice information and the supported network slice information of the RAN node of the wireless terminal.

In some embodiments, the second requested network slice information comprises mapped network slice information in a home public land mobile network, HPLMN, of the first requested network slice information and the supported network slice information of the RAN node of the wireless terminal.

In some embodiments, the second requested network slice information is generated in response to one of a PDU session establishment request, a handover request, a path switch request or a service request.

In some embodiments, the wireless communication method further comprises:

receiving, from the SMF, a message comprising updated network slice information of the PDU session, wherein the updated network slice information of the PDU session is set to the second requested network slice information.

In some embodiments, the wireless communication method further comprises transmitting, to the wireless terminal, the updated network slice information of the PDU session.

The present disclosure relates to a wireless communication method for use in a session management function, SMF. The wireless communication method comprises:

establishing a protocol data unit (PDU) session of first requested network slice information, receiving, from an access and mobility management function (AMF) second requested network slice information of the PDU session, and transmitting, to a wireless device corresponding to the PDU session via the AMF, a message comprising the second network slice information of the PDU session.

Various embodiments may implement the following features:

In some embodiments, the message is configured to update the PDU session to the second network slice information.

In some embodiments, the second requested network slice information comprises the first requested network slice information and supported network slice information of a RAN node of the wireless terminal.

In some embodiments, the second requested network slice information comprises mapped network slice information in a home public land mobile network, HPLMN, of the first requested network slice information and the supported network slice information of the RAN node of the wireless terminal.

The present disclosure relates to a wireless communication method for use in a wireless terminal. The wireless communication method comprises:

transmitting, to an access and mobility management function (AMF) first requested network slice information of a protocol data unit (PDU) session, receiving, from the AMF, second requested network slice information of the PDU session, and updating the PDU session to the second requested network slice information.

Various embodiments may implement the following features:

In some embodiments, the second requested network slice information comprises the first requested network slice information and supported network slice information of a radio access network (RAN) node of the wireless terminal.

In some embodiments, the second requested network slice information comprises mapped network slice information in a home public land mobile network, HPLMN, of the first requested network slice information and supported network slice information of a radio access network (RAN) node of the wireless terminal.

In some embodiments, the second requested network slice information is within one of a PDU session establishment accept or a PDU session modification command.

The present disclosure relates to a wireless network node of an access and mobility management function, AMF. The wireless network node comprises:

a communication unit, configured to:

receive, from a wireless terminal, first requested network slice information of a protocol data unit (PDU) session, and transmit, to a session management function (SMF) second requested network slice information, and a processor configured to generate the second requested network slice information based on the first requested network slice information of the PDU session and supported network slice information of a radio access network (RAN) node of the wireless terminal.

Various embodiments may implement the following feature:

In some embodiments, the processor is further configured to perform a wireless communication method of any of the foregoing described methods.

The present disclosure relates to a wireless network node of a session management function, SMF. The wireless network node comprises:

a processor configured to establish a protocol data unit (PDU) session of first requested network slice information, and a communication unit, configured to:

receive, from an access and mobility management function (AMF) second requested network slice information of the PDU session, and transmit, to a wireless terminal corresponding to the PDU session via the AMF, a message comprising the second network slice information of the PDU session.

Various embodiments may implement the following feature:

In some embodiments, the processor is further configured to perform a wireless communication method of any of the foregoing described methods.

The present disclosure relates to a wireless terminal. The wireless terminal comprises:

a communication unit, configured to:

transmit, to an access and mobility management function (AMF) first requested network slice information of a protocol data unit (PDU) session, and receive, from the AMF, second requested network slice information of the PDU session, and a processor configured to update the PDU session to the second requested network slice information.

Various embodiments may implement the following feature:

In some embodiments, the processor is further configured to perform a wireless communication method of any of the foregoing described methods.

The present disclosure relates to a computer program product comprising a computer-readable program medium code stored thereupon, the code, when executed by a processor, causing the processor to implement a wireless communication method of any of the foregoing described methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

BRIEF DESCRIPTION OF THE DRAWINGS

The above and other aspects and their implementations are described in greater detail in the drawings, the descriptions, and the claims.

DETAILED DESCRIPTION

Figure 1:
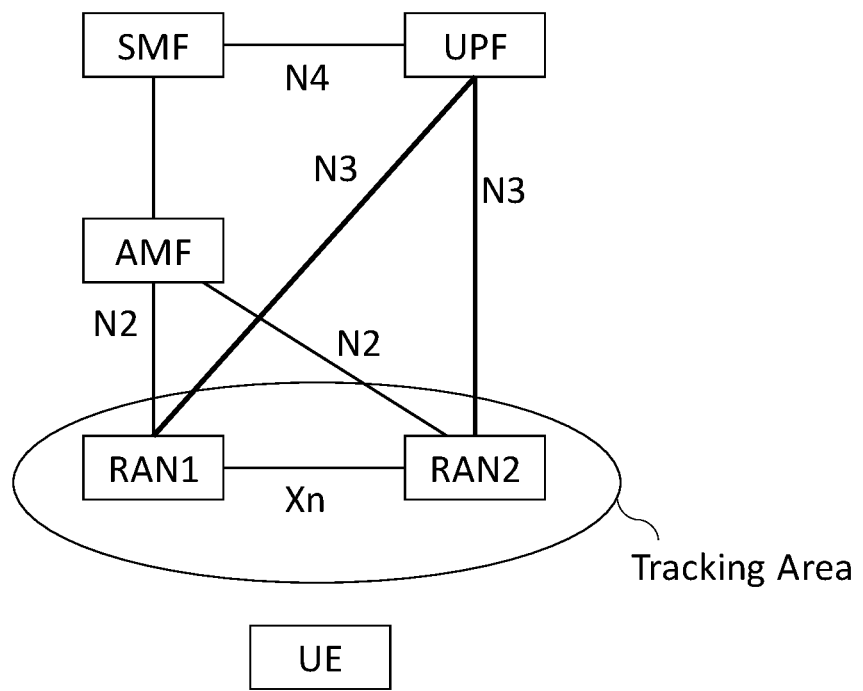
FIG. 1 shows a schematic diagram of a network architecture according to an embodiment of the present disclosure.

In the present disclosure, a network slice may be equal to an S-NSSAI, or vice versa, since each S-NSSAI identifies single network slice. FIG. 1 shows a schematic diagram of a network architecture, which comprises a user equipment (UE), radio access network (RAN) node RAN1 and RAN2, an access and mobility management function (AMF), a session management function (SMF) and a user plane function (UPF).

The AMF includes the following functionalities: registration management, connection management, reachability management and mobility management. In addition, the AMF may also perform other functionalities, such as access authentication and access authorization. The AMF is a non-access stratum (NAS) security termination and relays the session management (SM) NAS between the UE and the SMF.

The SMF includes the following functionalities: session establishment, modification and release, UE internet protocol (IP) address allocation & management (including optional authorization functions), selection and control of user plane (UP) function, downlink data notification, etc.

The UPF includes the following functionalities: serving as an anchor point for intra-/inter-radio access technology (RAT) mobility, packet routing & forwarding, traffic usage reporting, quality of service (QOS) handling for user plane, downlink packet buffering and downlink data notification triggering, etc.

In FIG. 1, there are two cells (i.e. RAN nodes RAN1 and RAN2) under the same tracking area. In an embodiment, the RAN node RAN1 supports a network slice S #1 and the RAN node RAN2 supports a network slice S #2. In an embodiment, the network slice S #1 may be configured for enhanced mobile broadband (eMBB) and the network slice S #2 may be configured for ultra reliable low latency communication (URLLC). In an embodiment, the RAN node RAN1 does not support the network slice S #2. In an embodiment, the RAN node RAN2 does not support the network slice S #1.

In an embodiment, the UE is in the tracking area of the RAN nodes RAN1 and RAN2.

In addition, FIG. 1 shows interfaces N2, N3, N4 and Xn among the SMF, AMF, UPF and RAN nodes RAN1 and RAN2, configured to allow the SMF, AMF, UPF and RAN nodes RAN1 and RAN2 to communicate with each other. In an embodiment, there is an interface N1 (not shown in FIG. 1) between the AMF and the UE and the AMF is able to communicate with the UE via the N1 interface.

Figure 2:
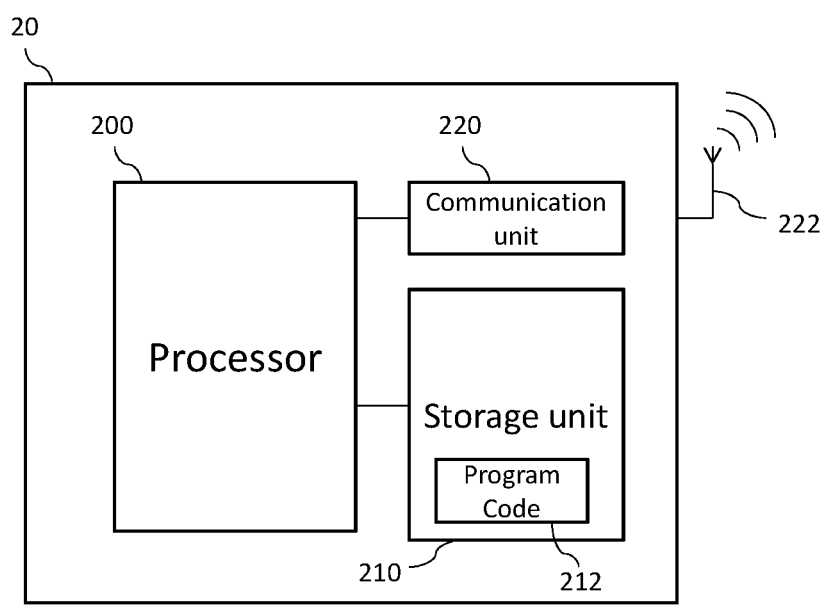
FIG. 2 shows an example of a schematic diagram of a wireless terminal according to an embodiment of the present disclosure.

FIG. 2 relates to a schematic diagram of a wireless terminal 20 according to an embodiment of the present disclosure. The wireless terminal 20 may be a UE, a mobile phone, a laptop, a tablet computer, an electronic book or a portable computer system and is not limited herein. The wireless terminal 20 may include a processor 200 such as a microprocessor or Application Specific Integrated Circuit (ASIC), a storage unit 210 and a communication unit 220. The storage unit 210 may be any data storage device that stores a program code 212, which is accessed and executed by the processor 200. Embodiments of the storage unit 212 include but are not limited to a subscriber identity module (SIM), read-only memory (ROM), flash memory, random-access memory (RAM), hard-disk, and optical data storage device. The communication unit 220 may a transceiver and is used to transmit and receive signals (e.g. messages or packets) according to processing results of the processor 200. In an embodiment, the communication unit 220 transmits and receives the signals via at least one antenna 222 shown in FIG. 2.

In an embodiment, the storage unit 210 and the program code 212 may be omitted and the processor 200 may include a storage unit with stored program code.

The processor 200 may implement any one of the steps in exemplified embodiments on the wireless terminal 20, e.g., by executing the program code 212.

The communication unit 220 may be a transceiver. The communication unit 220 may as an alternative or in addition be combining a transmitting unit and a receiving unit configured to transmit and to receive, respectively, signals to and from a wireless network node (e.g. a base station).

Figure 3:
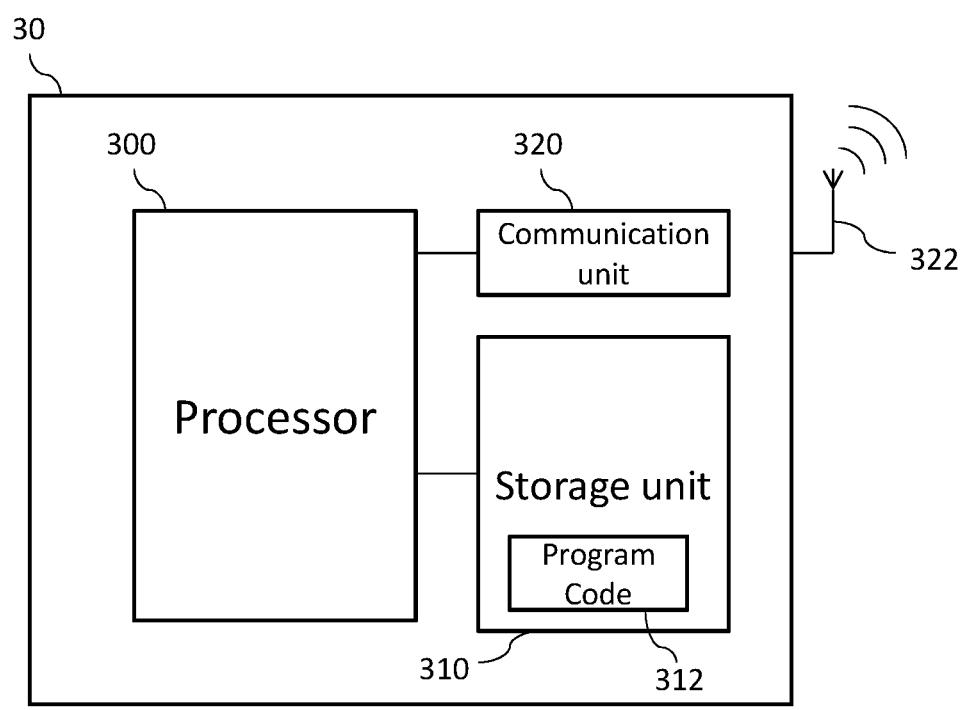
FIG. 3 shows an example of a schematic diagram of a wireless network node according to an embodiment of the present disclosure.

FIG. 3 relates to a schematic diagram of a wireless network node 30 according to an embodiment of the present disclosure. The wireless network node 30 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless network node 30 may be configured to implement network function(s), such as the AMF, the UPF and/or the SMF shown in FIG. 1. The wireless network node 30 may include a processor 300 such as a microprocessor or ASIC, a storage unit 310 and a communication unit 320. The storage unit 310 may be any data storage device that stores a program code 312, which is accessed and executed by the processor 300. Examples of the storage unit 312 include but are not limited to a SIM, ROM, flash memory, RAM, hard-disk, and optical data storage device. The communication unit 320 may be a transceiver and is used to transmit and receive signals (e.g. messages or packets) according to processing results of the processor 300. In an example, the communication unit 320 transmits and receives the signals via at least one antenna 322 shown in FIG. 3.

In an embodiment, the storage unit 310 and the program code 312 may be omitted. The processor 300 may include a storage unit with stored program code.

The processor 300 may implement any steps described in exemplified embodiments on the wireless network node 30, e.g., via executing the program code 312.

The communication unit 320 may be a transceiver. The communication unit 320 may as an alternative or in addition be combining a transmitting unit and a receiving unit configured to transmit and to receive, respectively, signals to and from a wireless terminal (e.g. a user equipment).

Figure 4:
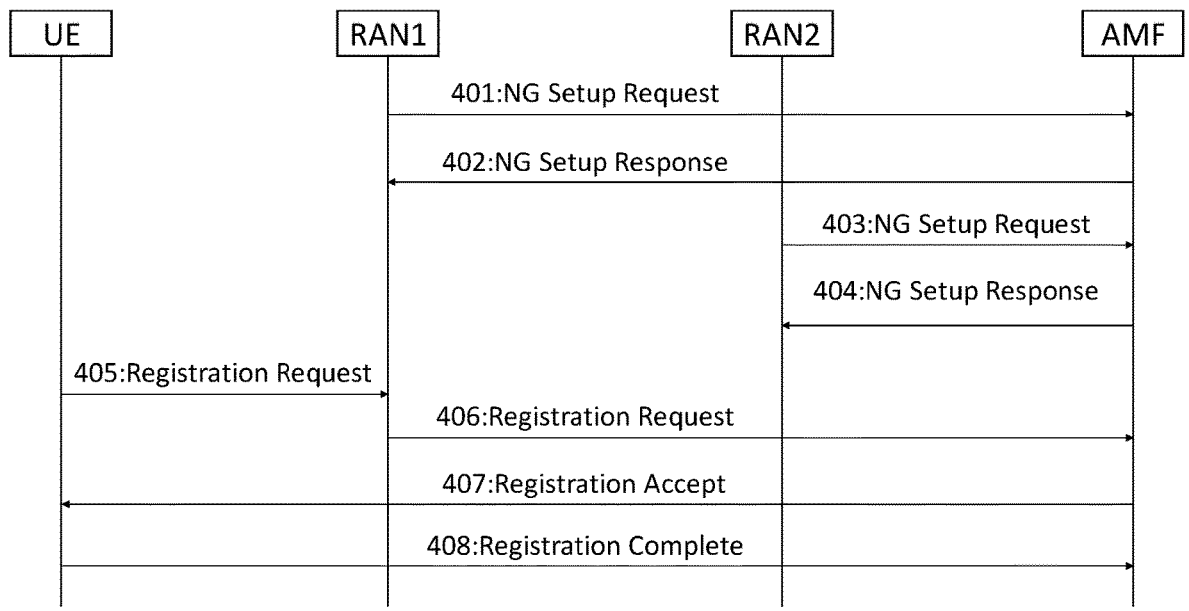
FIG. 4 shows a flowchart of a registration procedure according to an embodiment of the present disclosure.

FIG. 4 shows a flowchart of a registration procedure according to an embodiment of the present disclosure. In FIG. 4, the UE, the RAN nodes RAN1 and RAN2 and the AMF may be those shown in FIG. 1. That is, the RAN node RAN1 supports the network slice S #1 and the RAN node RAN2 supports the network slice S #2. In an embodiment, the RAN node RAN1 does not support the network slice S #2. In an embodiment, the RAN node RAN2 does not support the network slice S #1. In FIG. 4, the RAN node RAN1/RAN2 starts up and establishes a next-generation (NG) connection towards the AME for negotiating a capability of the RAN node RAN1/RAN2. Next, the UE performs a registration via the RAN node RAN1 towards the AMF.

More specifically, in step 401, the RAN node RAN1 initiates a registration procedure by sending (e.g. transmitting) an NG setup request message to the AMF. In an embodiment, the NG setup request message includes an identification RANID1 of the RAN node RAN1, a tracking area and the supported network slice S #1.

In step 402, the AMF responds the RAN node RAN1 with an NG setup response message including an identifier of the AMF.

In step 403, the RAN node RAN2 initiates a registration procedure by sending an NG setup request message to the AMF. In an embodiment, the NG setup request message includes an identification RANID2 of the RAN node RAN2, a tracking area and the supported network slice S #2.

In step 404, the AMF responds the RAN node RAN2 with an NG setup response message including the identifier of the AMF.

After the steps 401 to 404, the AMF acknowledges that the identification RANID1 (i.e. the RAN node RAN1) supports the network slice S #1, that the identification RANID2 (i.e. the RAN node RAN2) supports the network slice S #2 and that both the network slices S #1 and S #2 are supported under the same tracking area. In an embodiment, the AMF may also notify both the RAN nodes RAN1 and RAN2, e.g. respectively in steps 402 and 404, that the network slice S #1 is able to be replaced by the network slice S #2 (i.e. replacing the network slice S #1 by the network slice S #2 is supported). That is, it is possible to support handover from the network slice S #1 to the network slice S #2.

In step 405, the UE may power on and perform a cell selection. The UE initiates a registration request procedure by transmitting a registration request message to the AMF via the RAN node RAN1. In an embodiment, a requested NSSAI of the registration request message includes the network slices S #1 and S #2.

In step 406, the RAN node RAN1 performs an AMF selection and forwards the registration request message from the UE to the AMF, wherein the forwarded registration request message includes the current tracking area of the RAN node RAN1.

In step 407, the AMF determines an allowed NSSAI based on the received registration request (e.g. UE subscription and the requested NSSAI) and the supported network slice(s) in the current tracking area obtained in steps 401 to 404). In this embodiment, the AMF accepts the UE registration and allocates a temporary identity for the UE. The AMF includes the allowed NSSAI comprising both the network slices S #1 and S #2, a registration area and the temporary identity in a registration accept message and sends this message to the UE.

In step 408, the UE stores the temporary identity, the registration area and the allowed NSSAI and returns a registration complete message to the AMF.

After the registration procedure is completed, a core network (not shown) may send UE route selection policy (URSP) rules to the UE. When the UE needs to establish a PDU session for its application traffic, the UE is able to determine parameters including an S-NSSAI and a data network name (DNN) of the PDU session. In an embodiment, the URSP rules are sent by a home public land mobile network (HPLMN) of the UE. Therefore, the S-NSSAI in the URSP rules is valid for current PLMN of the UE in a non-roaming scenario and the S-NSSAI in the URSP rules is valid in the HPLMN in a roaming scenario.

Embodiment 1: PDU Session Establishment for Network Slice S #2

Figure 5A:
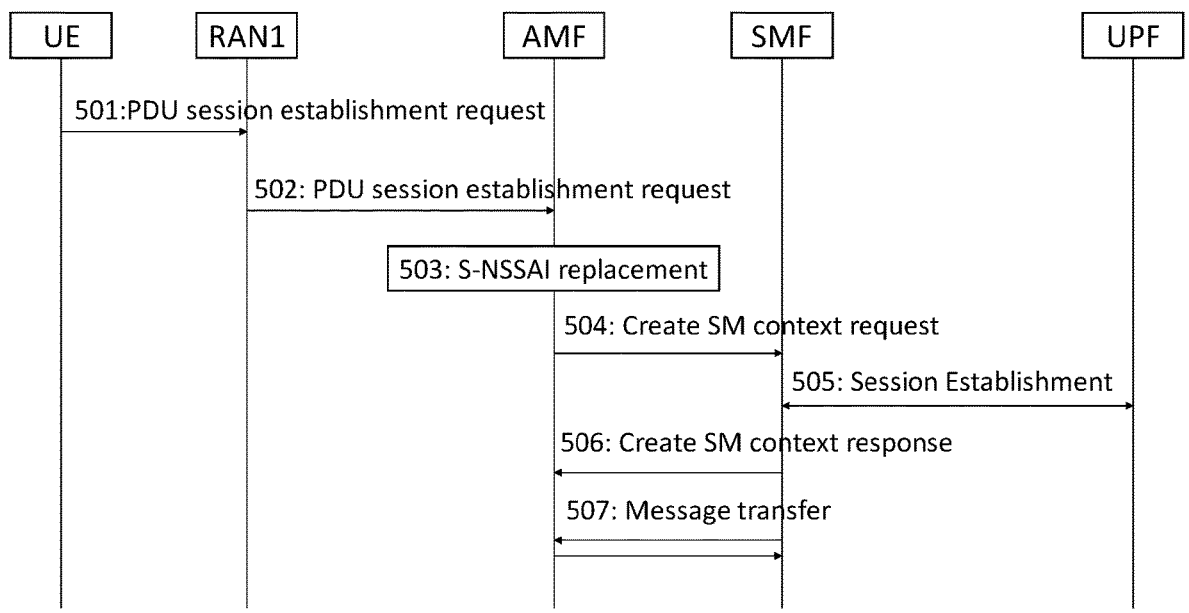
FIGS. 5A and 5B show a flowchart of a PDU session establishment procedure according to an embodiment of the present disclosure.
Figure 5B:
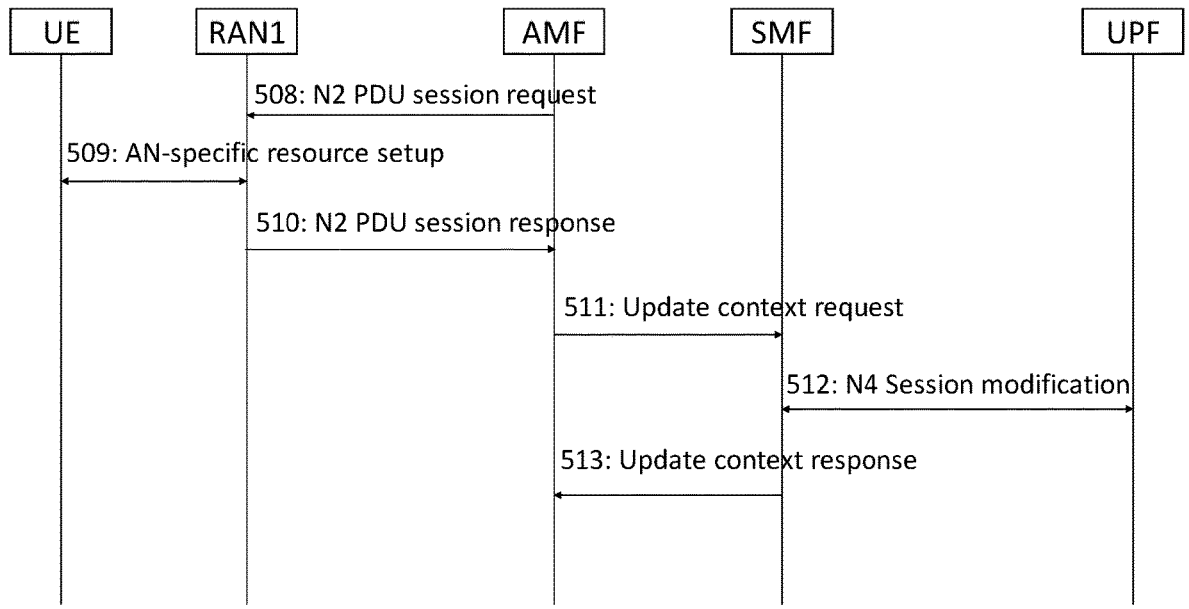

FIGS. 5A and 5B show a flowchart of a PDU session establishment procedure according to an embodiment of the present disclosure, wherein UE, RAN node RAN1, AMF, SMF and UPF shown in FIGS. 5A and 5B may be those shown in FIG. 1. In FIGS. 5A and 5B, the UE determines to establish a PDU session in the network slice S #2 for its application traffic based on the URSP rules, wherein the UE establishes the PDU session via the RAN node RAN1. Note that, the RAN node RAN1 supports the network slice S #1 and the RAN node RAN2 supports the network slice S #2. In this embodiment, the AMF determines to modify the requested S-NSSAI (i.e. network slice S #2) to the S-NSSAI which is supported by the current RAN node (i.e. network slice S #1 supported by the RAN node RAN1). More details of the procedure shown in FIGS. 5A and 5B are discussed in the following:

In step 501, the UE initiates a UE requested PDU session establishment procedure by transmitting an NAS message containing (e.g. comprising) a PDU session establishment request within an N1 session management (SM) container. In an embodiment, the PDU session establishment request includes information of the PDU session, such as a PDU session ID, requested PDU session type, requested S-NSSAI indicating the network slice S #2, requested data network name (DNN), . . . , etc.

In an embodiment of a non-roaming scenario, the requested S-NSSAI (i.e. the network slice S #2) is derived from the URSP rules and should be within the allowed NSSAI which is valid for current PLMN of the UE. In an embodiment of a roaming scenario, the requested S-NSSAI includes two parts: one part is the S-NSSAI (e.g. corresponding to the network slice S #2) of the PDU session which is valid within the current PLMN and another part is a mapped S-NSSAI (e.g. corresponding to a network slice S #3) in a HPLMN of the UE which is derived from the URSP rules.

In this embodiment, the NAS message is sent to the network (e.g. the AMF/SMF) via the RAN node RAN1.

In step 502, the RAN node RAN1 forwards the PDU session establishment request comprising the requested NSSAI to the AMF.

In step 503, the AMF generates a new requested NSSAI in response to the PDU session establishment request from the UE. In an embodiment, the AMF generates the new requested NSSAI based on the requested NSSAI received from the UE (via the RAN node RAN1) and the allowed NSSAI supported by the current RAN node RAN1 of the UE. More specifically, the AMF may check (e.g. determine) that the current RAN node 1 of the UE does not support the requested S-NSSAI (i.e. the network slice S #2) and that the network slice S #2 can be replaced by another network slice which is supported by the current RAN node RAN1 (i.e. the network slice S #1). Under such a condition, the AMF generates the new requested NSSAI for performing an S-NSSAI replacement. In an embodiment, the information indicating that replacing the network slice S #2 by the network slice S #1 is supported is preconfigured in the AMF. In an embodiment the roaming scenario, both the network slices S #1 and S #2 are mapped to the same S-NSSAI (e.g. the network slice S #3) in the HPLMN of the UE. That is, the network slice S #3 is corresponding to the mapped S-NSSAI which is valid in HPLMN and to which the network slices S #1 and S #2 are mapped.

In an embodiment of the non-roaming scenario, the AMF generates the new requested NSSAI including two parts: one part is the S-NSSAI which is valid in (e.g. supported by) the current RAN node RAN1 of the UE (i.e. the network slice S #1) and another part is the requested S-NSSAI (i.e. the network slice S #2) which is received from the UE but not supported by the current RAN node RAN1 of the UE.

In an embodiment of the roaming scenario, the AMF generates the new requested NSSAI including two parts: one part is the S-NSSAI which is valid in (e.g. supported by) the current RAN node RAN1 of the UE (i.e. the network slice S #1) and another part is the mapped S-NSSAI (i.e. the network slice S #3) in the HPLMN of the UE. In an embodiment, the mapped S-NSSAI is received from the UE.

In step p 504, the AMF performs an SMF selection and sends an Nsmf_PDUSession_CreateSMContext request (message) to the selected SMF. In an embodiment, the message includes a subscription permanent identifier (SUPI) of the UE, DNN, the new requested S-NSSAI, the PDU session ID, an AMF ID, the request type, the N1 SM container (i.e. PDU session establishment request), user location information, . . . , etc.

In step 505, the SMF selects a UPF for the PDU session. In addition, the SMF establishes an N4 association with the selected UPF, wherein N3 tunnel information is allocated by the UPF and provided to the SMF.

In step 506, the SMF returns an Nsmf_PDUSession_CreateSMContext response (message), which includes a cause value indicating whether the request is accepted or not. In an embodiment, the message also includes the SM context ID allocated by the SMF. In an embodiment, the AMF uses the SM context ID for subsequent messages towards the SMF.

In step 507, the SMF sends an Namf_Communication_N1N2MessageTransfer message to the AMF. In an embodiment, the message includes parameters such as the PDU session ID, N2 SM information (e.g. comprising the PDU session ID, QOS flow IDs (QFI(s)), QOS profile(s), N3 tunnel information of the UPF, the S-NSSAI of the PDU session, etc.), the N1 SM container (e.g. comprising a PDU session establishment accept (e.g. QoS rule(s), accepted S-NSSAI, DNN, etc.)). In the N2 SM information, the S-NSSAI is set to the network slice S #1 which is supported by the current RAN node RAN1 of the UE. In the N1 SM container, the accepted S-NSSAI is set to the new requested S-NSSAI generated in step 503. In response to the message, the AMF sends a response (message) to SMF.

In step 508, the AMF sends an N2 PDU session request (message) to the RAN node RAN1. In an embodiment, this message includes the received N2 SM information, an NAS message (e.g. the PDU session ID, the N1 SM container (e.g. the PDU session establishment accept)).

In step 509, the RAN node RAN1 may issue an AN-specific signaling exchange with the UE that is related with the information received from the SMF in step 508 (e.g. the PDU session establishment accept). For example, a radio resource control (RRC) connection reconfiguration may take place with the UE, to establish the necessary next generation RAN (NG-RAN) resources related to the QoS rules for the PDU session request. In an embodiment, the RAN node RAN1 also allocates the N3 Tunnel information for the PDU session.

In step 510, the RAN node RAN1 sends an N2 PDU session response (message) to the AMF. This message includes parameters such as the PDU session ID, a cause, the N2 SM information (e.g. the PDU session ID, the N3 Tunnel Info, a list of accepted/rejected QFI(s)), etc.

In step 511, the AMF sends an Nsmf_PDUSession_UpdateSMContext request (message) (comprising, e.g., SMF SM context ID, N2 SM information) to the SMF.

In step 512, the SMF initiates an N4 session modification procedure with the UPF to provide the N3 tunnel information received from the RAN node RAN1.

In step 513, the SMF sends an Nsmf_PDUSession_UpdateSMContext response (message) to the AMF.

After the procedure shown in FIGS. 5A and 5B is completed, the PDU session is established. The UE stores the accepted S-NSSAI for the PDU session. In an embodiment of the non-roaming scenario, the accepted S-NSSAI has two parts: one part is the network slice S #1 which is supported by the current RAN node RAN1 of the UE and another part is the network slice S #2 which is derived from the URSP rules.

In an embodiment of the roaming scenario, the accepted S-NSSAI has two parts: one part is the network slice S #1 which is supported by the current RAN node RAN1 of the UE and another part is the network slice S #3 (i.e. mapped network slice information) which is derived from the URSP rules and is valid in the HPLMN.

Figure 6A:
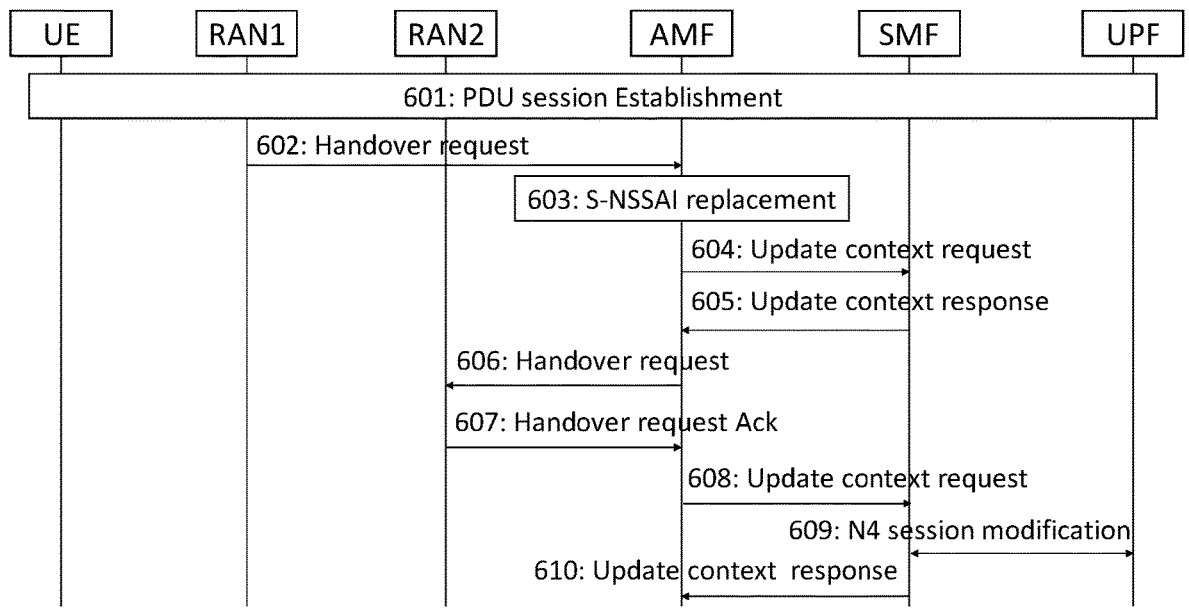
FIGS. 6A and 6B show a flowchart of an N2 handover procedure according to an embodiment of the present disclosure.
Figure 6B:
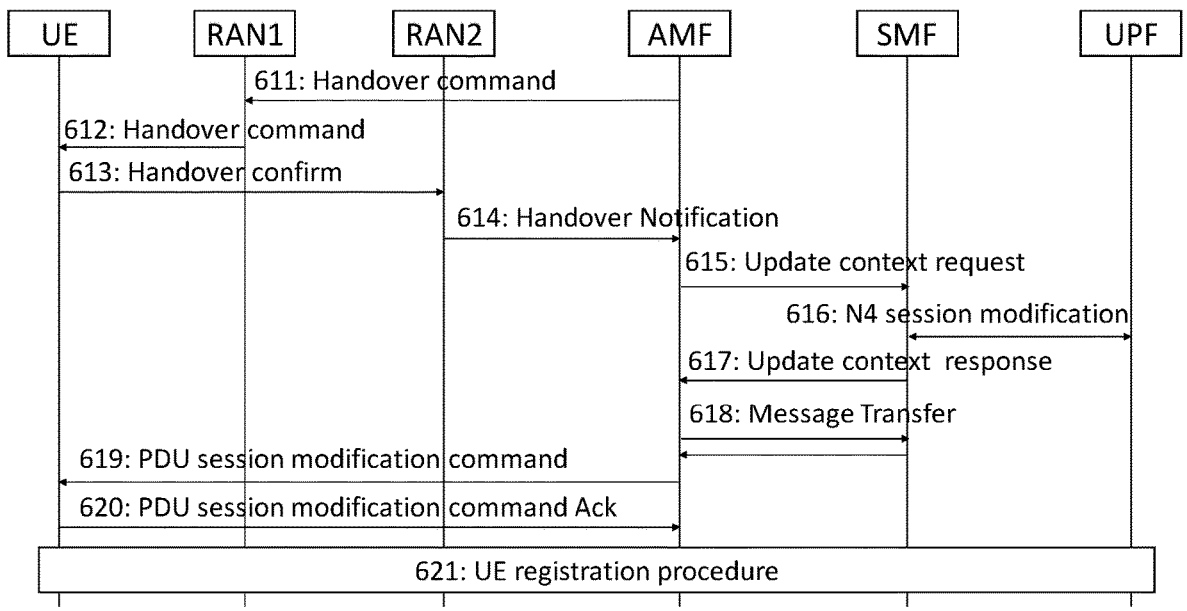

FIGS. 6A and 6B show a flowchart of an N2 handover procedure according to an embodiment of the present disclosure, wherein UE, RAN nodes RAN1 and RAN2, AMF, SMF, UPF shown in FIGS. 6A and 6B may be those shown in FIG. 1. In FIGS. 6A and 6B, the UE needs to handover via an N2 interface to the target RAN node RAN2. The AMF modifies a network slice of the PDU session and notifies the modification to the network. The network updates the PDU session context and updates the new network slice of the PDU session to the UE.

More specifically, in step 601, the UE establishes a PDU session with the network slice S #1 via the RAN node RAN1, e.g., via the PDU session establishment procedure shown in FIGS. 5A and 5B.

In step 602, the RAN node RAN1 performs a UE measurement and determines that a handover to the RAN node RAN2 is needed. The RAN node RAN1 (or RAN2) sends a handover request (message) (comprising, e.g., a target ID (the RAN node RAN2), a source to target transparent container, an SM N2 information list, PDU session ID(s)) to the AMF via the N2 interface.

In step 603, the AMF generates a new S-NSSAI in response to the handover request (message). In an embodiment, the AMF generates the new S-NSSAI based on the current S-NSSAI (i.e. the network slice S #1) of the PDU session and the S-NSSAI (i.e. the network slice S #2) supported by the target RAN node RAN2 of the UE. More specifically, the AMF checks (e.g. determines) that the target RAN node RAN2 identified by the target ID of the handover request does not support the current S-NSSAI (i.e. the network slice S #1) of the PDU session, that the target RAN node RAN2 supports the network slice S #2 and that the network slice S #1 can be replaced by S #2. Under such a condition, the AMF performs an S-NSSAI replacement procedure. In an embodiment, the information indicating that the network slice S #1 can be replaced by the network slice S #2 (e.g. replacing the network slice S #1 by the network slice S #2 is supported) is preconfigured in the AMF. In an embodiment of the roaming scenario, both the network slices S #1 and S #2 are mapped to the same S-NSSAI (e.g. the network slice S #3) in the HPLMN of the UE.

In an embodiment of the non-roaming scenario, the AMF generates the new S-NSSAI including two parts: one part is the requested S-NSSAI (i.e. the network slice S #2) which is valid in the target RAN2 node and another part is the S-NSSAI which is the original network slice of the PDU session (i.e. the network slice S #1 supported by the current RAN node RAN1 of the PDU session).

In an embodiment of the roaming scenario, the AMF generates the new S-NSSAI including two parts: one part is the requested S-NSSAI (i.e. the network slice S #2) which is valid in the target RAN node RAN2 and another part is the mapped S-NSSAI (i.e. the network slice S #3) for the HPLMN which is received from the UE.

In an embodiment inter AMF mobility, the S-NSSAI replacement procedure is performed by a target AMF corresponding to the requested S-NSSAI (i.e. the network slice S #2).

In step 604, the AMF sends an Nsmf_PDUSession_UpdateSMContext request (message) (comprising, e.g., the PDU session ID, the new S-NSSAI, N2 SM Information) to the SMF. The SMF checks (determiners) whether the N2 handover with the new S-NSSAI can be accepted. When the N2 handover is accepted, the SMF replaces the network slice of the PDU session with the new S-NSSAI received from the AMF.

In step 605, the SMF sends an Nsmf_PDUSession_UpdateSMContext response (message) (comprising, e.g., the PDU session ID, N2 SM Information) to the AMF. In an embodiment, the N2 SM information includes the S-NSSAI which is supported by the target RAN node RAN2 (i.e. the network slice S #2).

In step 606, the AMF sends a handover request (message) (comprising, e.g., source to target transparent container, N2 MM Information, N2 SM Information list) to the RAN node RAN2. In an embodiment, the AMF determines the target RAN (i.e. the RAN node RAN2) based on the target ID. In an embodiment, the source to target transparent container is forwarded as that received from the source RAN (i.e. the RAN node RAN1).

In step 607, the RAN node RAN2 sends a handover request acknowledge (message) (comprising, e.g., target to source transparent container, a list of PDU sessions to handover with the N2 SM information) to the AMF. In an embodiment, the target to source transparent container includes a UE container with an access stratum part and a NAS part. In an embodiment, the N2 SM information includes the N3 tunnel information of the PDU session in the RAN node RAN2.

In step 608, The AMF sends an Nsmf_PDUSession_UpdateSMContext request message (comprising, e.g., the PDU session ID, the N2 SM Information received from the RAN node RAN2) to the SMF.

In step 609, the SMF performs an N4 session modification procedure with the UPF to update the N3 tunnel information of the PDU session in the RAN node RAN2.

In step 610, the SMF sends an Nsmf_PDUSession_UpdateSMContext response (message) (comprising, e.g., the PDU session ID, the N2 SM Information) to the AMF.

In step 611, the AMF sends a handover command (comprising, e.g., the target to source transparent container, the List of PDU sessions to handover with the N2 SM information) to the RAN node RAN1.

In step 612, the RAN node RAN1 sends a handover command (comprising, e.g., a UE container) to the UE, wherein the UE container is a UE part of the target to source transparent container which is sent transparently from the RAN node RAN2 via the AMF to the RAN node RAN1 and is provided to the UE by the RAN node RAN1.

In step 613, after the UE successfully synchronizes to the target cell, the UE sends a handover confirm (message) to the RAN node RAN2. In an embodiment, the handover is considered as successful by the UE based on the handover confirm (message).

In step 614, the RAN node RAN2 transmits a handover notify (message) to the AMF, wherein the handover is based on this message considered as successful in the RAN node RAN2.

In step 615, the AMF sends an Nsmf_PDUSession_UpdateSMContext request (message) (comprising, e.g., PDU session ID, N2 SM information) to the SMF.

In step 616, the SMF initiates an N4 session modification procedure with the UPF, so as to allow the UPF to send the downlink (DL) data towards the RAN node RAN2 via the N2 tunnel.

In step 617, the SMF sends an Nsmf_PDUSession_UpdateSMContext response (message) to the AMF.

In step 618, when the SMF determines that the current network slice of the PDU session is modified in step 604, the SMF initiates to modify (e.g. update) the network slice information of the PDU session, e.g., in the AMF and/or the UE. In this embodiment, the SMF sends a Namf_Communication_NIN2MessageTransfer message to the AMF. This message includes parameters such as the PDU session ID, the new S-NSSAI, the N1 SM container (comprising, e.g. PDU session modification command (new S-NSSAI)). Note that, the new S-NSSAI in the N1 SM container is set to the new S-NSSAI received from AMF. The AMF sends response to SMF.

In an embodiment of the roaming scenario, the update of the PDU session slice information in the UE is initiated by a visited SMF (V-SMF).

In step 619, the AMF updates the PDU session context with the new S-NSSAI. The AMF sends a PDU session modification command (message) (comprising the new S-NSSAI) to the UE, to modify the slice information of the PDU session.

In step 620, the UE updates the PDU session context with the new S-NSSAI and the UE sends a PDU session modification command acknowledge (message) to the AMF.

In step 621, after step 611, the UE may initiate a UE registration procedure to receive new Allowed NSSAI and new registration area via the RAN node RAN2.

Figure 7A:
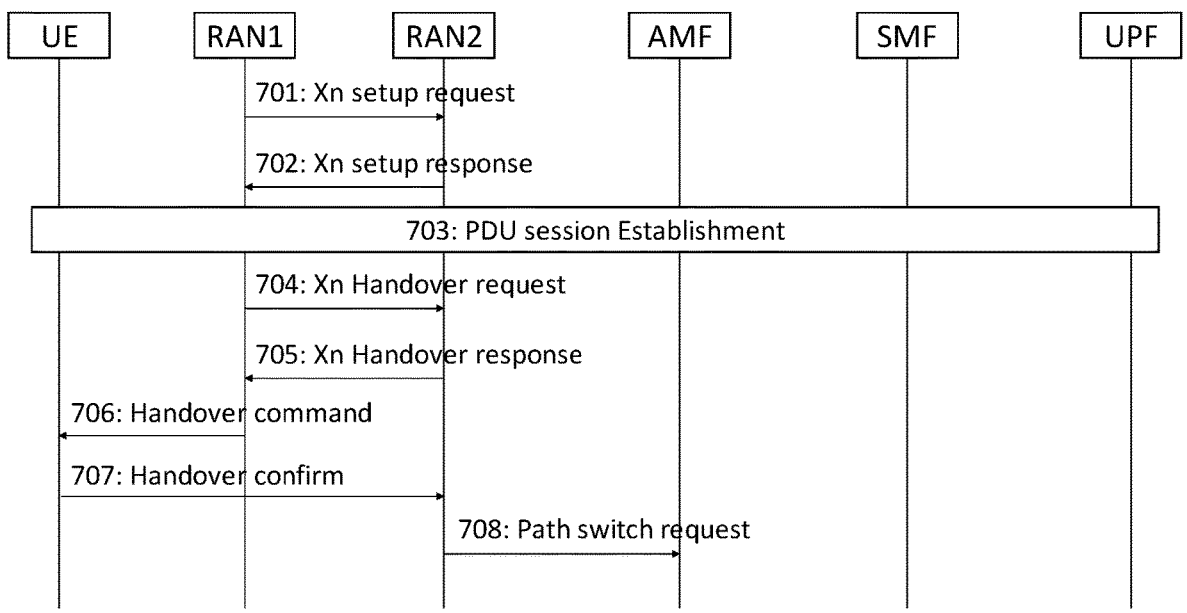
FIGS. 7A and 7B show a flowchart of an Xn handover procedure according to an embodiment of the present disclosure.
Figure 7B:
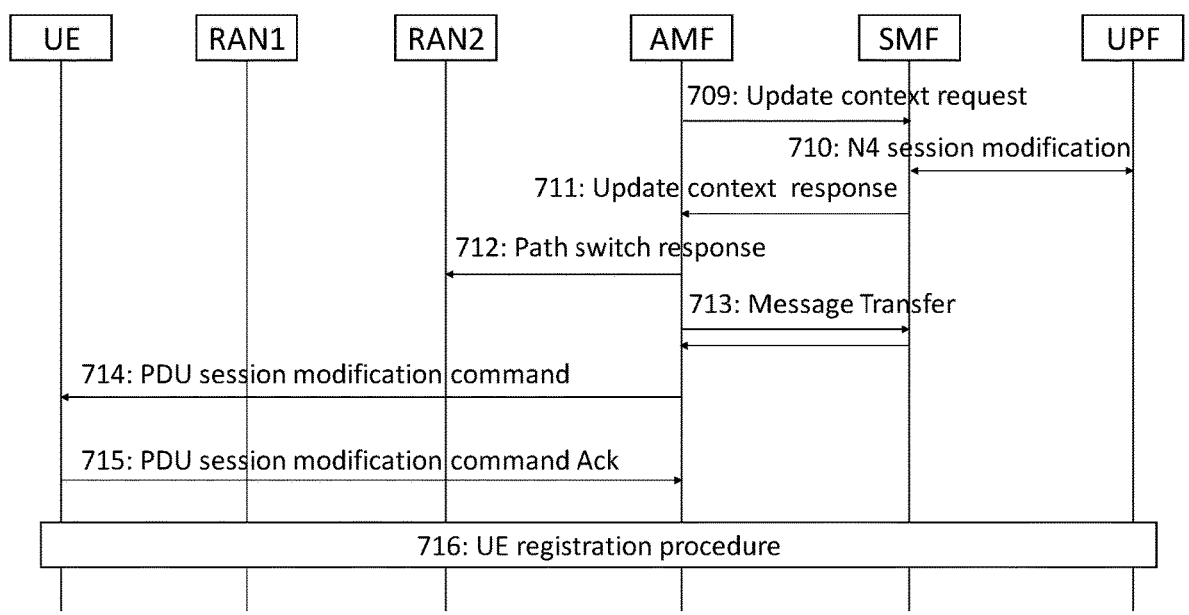

FIGS. 7A and 7B show a flowchart of an Xn handover procedure according to an embodiment of the present disclosure, wherein UE, RAN nodes RAN1 and RAN2, AMF, SMF and UPF may be those shown in FIG. 1. In FIGS. 7A and 7B, the UE needs to handover, via an Xn interface, to the target RAN node RAN2. The RAN node RAN1 or RAN2 modifies the network slice of the PDU session and notifies the network. The network updates the PDU session context and updates the UE with the updated network slice of the PDU session.

More specifically, in step 701, the RAN node RAN1 sends an Xn setup request (message) towards the RAN node RAN2, wherein the Xn setup request (message) includes supported S-NSSAI of the RAN node RAN1 (i.e. the network slice S #1).

In step 702, the RAN node RAN2 sends an Xn setup response (message) towards the RAN node RAN1, wherein the Xn setup response (message) may include supported S-NSSAI of the RAN node RAN2 (i.e. the network slice S #2).

In an embodiment, after steps 701 and 702, the RAN nodes RAN1 and RAN2 exchanges supported network slices with each other. During an NG setup procedure, the AMF may notify the RAN node RAN1 and RAN2 that the network slice S #1 can be replaced by S #2. The information indicating that the network slice S #1 can be replaced by the network slice S #2 may be preconfigured in the AMF. In an embodiment of the roaming scenario, both the network slices S #1 and S #2 are mapped to the same S-NSSAI (e.g. the network slice S #3) in the HPLMN.

In step 703, the UE establishes a PDU session with the network slice S #1 via the RAN node RAN1, e.g. by performing the PDU session establishment procedure shown in FIGS. 5A and 5B.

In step 704, the RAN node RAN1 performs a UE measurement and determines that a handover to the RAN node RAN2 is needed. Note that, the RAN node RAN1 is aware of that the RAN node RAN2 does not support the network slice S #1, that the RAN node RAN2 supports the network slice S #2 and that the network slice S #1 can be replaced by the network slice S2. Thus, the RAN node RAN1 sends an Xn handover request (message) to the RAN node RAN2. In addition, the RAN node RAN1 may modify the S-NSSAI of the PDU session as the network slice S #2.

In step 705, The RAN node RAN2 determines that the network slice S #1 can be replaced by the network slice S #2 and determines to accept the handover request. The RAN node RAN2 sets the S-NSSAI of the PDU session as the network slice S #2 and sends an Xn handover response (message) to the RAN node RAN1. In an embodiment, the Xn handover response (message) includes an RRC container of the RAN node RAN2 (e.g. RAN2 RRC container).

In step 706, the RAN node RAN1 sends a handover command to the UE, wherein the handover command includes an RRC container of the RAN node RAN2.

In step 707, the UE sends a handover confirm (message) to the RAN node RAN2 after the successfully synchronized to the target cell.

In step 708, the RAN node RAN2 sends a path switch request to the AMF. In an embodiment, the path switch request includes the network slice S #2 as the S-NSSAI of the PDU session and the N2 SM information includes the N3 tunnel information of the RAN node RAN2.

In step 709, the AMF generates a new S-NSSAI for the PDU session in response to the path switch request. In an embodiment, the AMF generates the new S-NSSAI for the PDU session based on the S-NSSAI (i.e. the network slice S #2 supported by the target RAN node RAN2) received from the RAN node RAN2 and the current S-NSSAI of the PDU session and sends an Nsmf_PDUSession_UpdateSM-Context request (message) (comprising, e.g., the PDU session ID, the new S-NSSAI, N2 SM information) to the SMF.

In an embodiment of the non roaming scenario, the new NSSAI includes two parts: one part is the S-NSSAI (i.e. the network slice S #2) which is valid in the target RAN node RAN2 node and another part is the current S-NSSAI which is the original network slice S #1 of the PDU session.

In an embodiment of roaming scenario, the new NSSAI includes two parts: one part is the S-NSSAI (i.e. the network slice S #2) which is valid in the target RAN2 node and another part is the mapped S-NSSAI (e.g. the network slice S #3) in the HPLMN which may be received from the UE.

In step 710, the SMF initiates an N4 session modification procedure with the UPF, to provide the N3 tunnel information received from the RAN node RAN2.

In step 711, the SMF sends an Nsmf_PDUSession_UpdateSMContext response (message) to the AMF.

In step 712, the AMF sends a path switch response (message) to the RAN node RAN2.

In step 713, the SMF determines that the network slice information of the PDU session is modified in step 709 and initiates to modify (e.g. update) the network slice information of the PDU session in the UE. The SMF sends an Namf_Communication_NIN2MessageTransfer message to the AMF, wherein this message includes parameters such as the PDU session ID, the new S-NSSAI, N1 SM container (comprising, e.g., a PDU session modification command (new S-NSSAI)). The AMF sends a response to the SMF. Note that, the new S-NSSAI in the message is set to the new NSSAI received from the AMF.

In an embodiment of the roaming scenario, the update of the network slice information of the PDU session in the UE is initiated by the V-SMF.

In step 714, the AMF updates the PDU session context with the new S-NSSAI and sends a PDU session modification command (comprising the new S-NSSAI) to the UE for modifying the network slice of the PDU session.

In step 715, the UE updates the PDU session context with the new S-NSSAI and sends a PDU session modification command acknowledge to the AMF.

In step 716, after step 707, the UE may initiate a UE registration procedure to receive new allowed NSSAI.

Figure 8A:
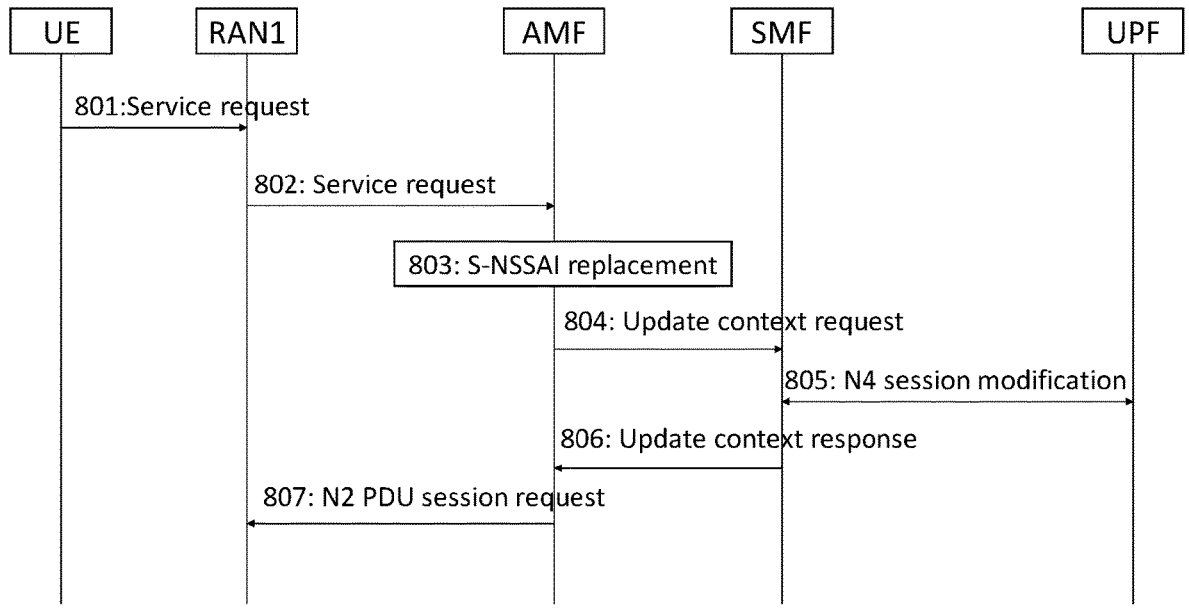
FIGS. 8A and 8B show a flowchart of a service request procedure according to an embodiment of the present disclosure.
Figure 8B:
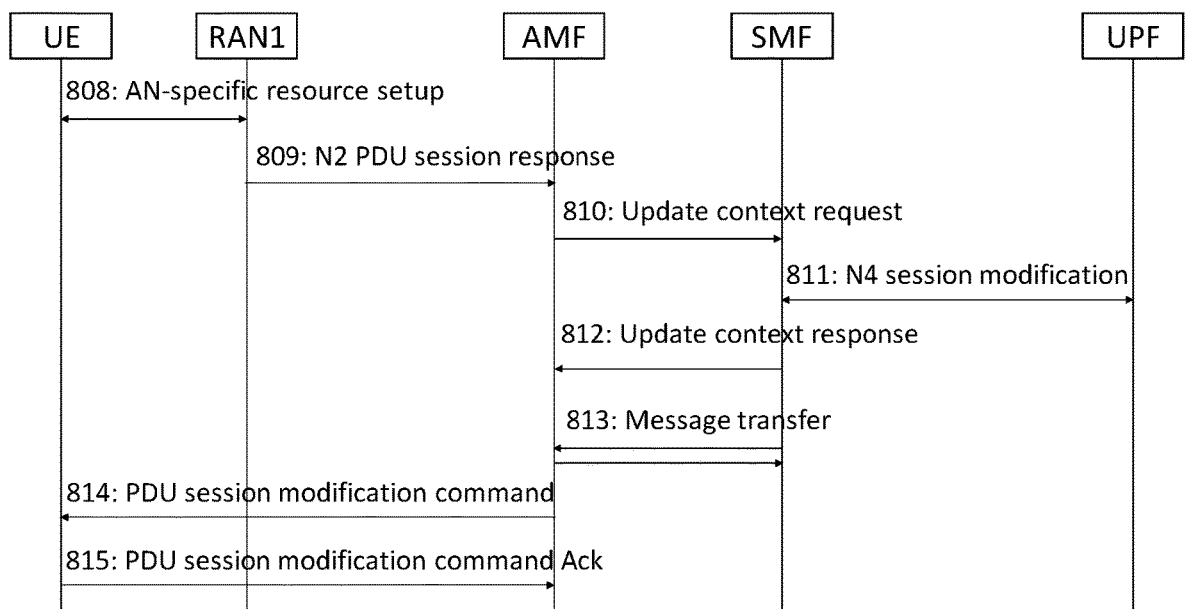

FIGS. 8A and 8B show a flowchart of a service request procedure according to an embodiment of the present disclosure, wherein UE, RAN node RAN1, AMF, SMF and UPF shown in FIGS. 8A and 8B may be those shown in FIG. 1. In FIGS. 8A and 8B, when the UE initiates a service request procedure to activate a PDU session of the network slice S #2, the AMF determines that the current RAN node RAN1 of the UE cannot support the original S-NSSAI of the PDU session (i.e. the network slice S #2). Under such a condition, the AMF determines to modify the network slice information of the PDU session from the original S-NSSAI (i.e. the network slice S #2) to the S-NSSAI which is supported by the current RAN node RAN1 of the UE (i.e. the network slice S #1).

More specifically, in step 801, the UE initiates the service request procedure via RAN node RAN1 by transmitting a service request to the RAN node RAN1, to activate the PDU session. Note that, the PDU session is established with the S-NSSAI corresponding to the network slice S #2.

In step 802, the RAN node RAN1 forwards the service request to the AMF.

In step 803, the AMF generates a new S-NSSAI for the PDU session in response to the service request. In an embodiment, the AMF generates the new S-NSSAI based on the current S-NSSAI (i.e. the network slice S #2 of the PDU session) and the S-NSSAI supported by the current RAN node RAN1 of the UE. Specifically, the AMF checks (determines) that the current RAN node RAN1 of the UE does not support the original S-NSSAI of the PDU session (i.e. the network slice S #2) and that the network slice S #2 can be replaced by the network slice S #1 of the RAN node RAN1. Thus, the AMF performs an S-NSSAI replacement. In an embodiment, the information indicating that the network slice S #2 can be replaced by the network slice S #1 is preconfigured in the AMF. In an embodiment of the roaming scenario, both the network slices S #1 and S #2 are mapped to the same S-NSSAI (e.g. the network slice S #3) in the HPLMN. That is, the network slice S #3 is corresponding to the mapped S-NSSAI valid in the HPLMN.

In an embodiment of the non roaming scenario, the AMF generates the new requested NSSAI including two parts: one part is the S-NSSAI which is valid in (e.g. supported by) the current RAN node RAN1 of the UE (i.e. the network slice S #1) and another part is the requested S-NSSAI (i.e. the network slice S #2) which is received from the UE but not supported by the current RAN node RAN1 of the UE.

In case of roaming, the AMF generates the new requested NSSAI including two parts: one part is the S-NSSAI which is valid in (e.g. supported by) the current RAN node RAN1 of the UE (i.e. the network slice S #1) and another part is the mapped S-NSSAI (i.e. the network slice S #3) for the HPLMN of the UE. In an embodiment, the mapped S-NSSAI is received from the UE.

In step 804, the AMF sends an Nsmf_PDUSession_UpdateSMContext request (message) to the SMF, wherein this message includes SUPI, DNN, the new S-NSSAI, PDU session ID, AMF ID, User location information, . . . , etc.

In step 805, the SMF may ask the UPF to modify the N3 tunnel information in the UPF via an N4 Session modification procedure. In an embodiment, the N3 tunnel information is allocated by UPF and provided to the SMF.

In step 806, the SMF returns an Nsmf_PDUSession_UpdateSMContext response (message). This message includes the N2 SM information (comprising, e.g. PDU session ID, QFI(s), QoS Profile(s), N3 Tunnel Info of UPF, S-NSSAI, etc.) Note that, the S-NSSAI in the N2 SM information is set to the network slice S #1 which is supported by the current RAN node RAN1 of the UE.

In step 807, the AMF sends an N2 PDU session request (message) to the RAN node RAN1. In an embodiment, this message includes the N2 SM information and an NAS message (e.g. service accept message).

In step 808, the RAN node RAN1 may issue an AN specific signaling exchange with the UE that is related with the N2 SM information received from the SMF. For example, an RRC connection reconfiguration may take place with the UE, to establish the necessary NG-RAN resources related to the QoS rules for the PDU session request. RAN and to allocate the N3 tunnel information for the PDU session. The RAN node RAN1 also returns a service accept (message) to the UE.

In step 809, the RAN node RAN1 sends an N2 PDU session response (message) to the AMF. In an embodiment, this message includes parameters such as PDU session ID, Cause, N2 SM information (PDU session ID, N3 Tunnel Info, List of accepted/rejected QFI(s)), etc.

In step 810, the AMF sends an Nsmf_PDUSession_UpdateSMContext request (message) (comprising, e.g., SMF SM Context ID and N2 SM information) to the SMF.

In step 811, the SMF initiates an N4 session modification procedure with the UPF to provide the N3 tunnel information received from the RAN node RAN1.

In step 812, the SMF sends an Nsmf_PDUSession_UpdateSMContext response (message) to the AMF.

In step 813, the SMF sends an Namf_Communication_NIN2MessageTransfer message to the AMF, to update the network slice information of the PDU session in the UE. In an embodiment, this message includes parameters such as PDU session ID, new S-NSSAI, N1 SM container (PDU session Modification Command (new S-NSSAI)). The AMF sends response to the SMF. Note that, the new S-NSSAI is that received from the AMF.

In an embodiment of the roaming scenario, the update of the network slice information of the PDU session in the UE is initiated by a V-SMF.

In step 814, the AMF updates the PDU session context with the new S-NSSAI and sends a PDU session modification command (comprising the new S-NSSAI) to the UE to modify the network slice of the PDU session.

In step 815, the UE updates the PDU session context with the new S-NSSAI and sends a PDU session modification command acknowledge to the AMF.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method for use in an access and mobility management function ("AMF"), the wireless communication method comprising:
   receiving, from a wireless terminal, first requested network slice information of a protocol data unit ("PDU") session;
   generating second requested network slice information based on the first requested network slice information of the PDU session and supported network slice information of a radio access network ("RAN") node of the wireless terminal, wherein the second requested network slice information comprises the first requested network slice information and the supported network slice information of the RAN node of the wireless terminal; and
   transmitting, to a session management function ("SMF"), the second requested network slice information.

2. The wireless communication method of claim 1, wherein the RAN node does not support the first requested network slice information.

3. The wireless communication method of claim 1, wherein the second requested network slice information comprises mapped network slice information in a home public land mobile network ("HPLMN") of the first requested network slice information and the supported network slice information of the RAN node of the wireless terminal.

4. The wireless communication method of claim 1, wherein the second requested network slice information is generated in response to one of a PDU session establishment request, a handover request, a path switch request, or a service request.

5. The wireless communication method of claim 1, further comprising:
   receiving, from the SMF, a message comprising updated network slice information of the PDU session, wherein the updated network slice information of the PDU session is set to the second requested network slice information; and
   transmitting, to the wireless terminal, the updated network slice information of the PDU session.

6. A wireless communication method for use in a session management function, ("SMF"), the wireless communication method comprising:
   establishing a protocol data unit ("PDU") session of first requested network slice information;
   receiving, from an access and mobility management function ("AMF"), second requested network slice information of the PDU session, wherein the second requested network slice information comprises the first requested network slice information and supported network slice information of a radio access network ("RAN") node of a wireless terminal; and
   transmitting, to a wireless terminal corresponding to the PDU session via the AMF, a message comprising the second requested network slice information of the PDU session.

7. The wireless communication method of claim 6, wherein the message is configured to update the PDU session to the second requested network slice information.

8. The wireless communication method of claim 6, wherein the second requested network slice information comprises mapped network slice information in a home public land mobile network ("HPLMN") of the first requested network slice information and the supported network slice information of the RAN node of the wireless terminal.

9. A wireless communication method for use in a wireless terminal, the wireless communication method comprising:
transmitting, to an access and mobility management function ("AMF"), first requested network slice information of a protocol data unit ("PDU") session;
receiving, from the AMF, second requested network slice information of the PDU session, wherein the second requested network slice information comprises the first requested network slice information and supported network slice information of a radio access network ("RAN") node of the wireless terminal; and
updating the PDU session to the second requested network slice information.

10. The wireless communication method of claim 9, wherein the second requested network slice information comprises mapped network slice information in a home public land mobile network ("HPLMN") of the first requested network slice information and supported network slice information of the RAN node of the wireless terminal.

11. The wireless communication method of claim 9, wherein the second requested network slice information is within one of a PDU session establishment accept, or a PDU session modification command.

12. A wireless network node of an access and mobility management function ("AMF"), the wireless network node comprising:
a communication unit configured to:
receive, from a wireless terminal, first requested network slice information of a protocol data unit ("PDU") session; and
transmit, to a session management function ("SMF"), second requested network slice information, and
a processor configured to:
generate the second requested network slice information based on the first requested network slice information of the PDU session and supported network slice information of a radio access network ("RAN") node of the wireless terminal,
wherein the second requested network slice information comprises the first requested network slice information and the supported network slice information of the RAN node of the wireless terminal.

13. A wireless network node of a session management function ("SMF"), the wireless network node comprising:
a processor configured to establish a protocol data unit ("PDU") session of first requested network slice information; and
a communication unit configured to:
receive, from an access and mobility management function ("AMF"), second requested network slice information of the PDU session, wherein the second requested network slice information comprises the first requested network slice information and supported network slice information of a radio access network ("RAN") node of a wireless terminal; and
transmit, to the wireless terminal corresponding to the PDU session via the AMF, a message comprising the second requested network slice information of the PDU session.

14. A wireless terminal, comprising:
a communication unit configured to:
transmit, to an access and mobility management function ("AMF"), first requested network slice information of a protocol data unit ("PDU") session; and
receive, from the AMF, second requested network slice information of the PDU session,
wherein the second requested network slice information comprises the first requested network slice information and supported network slice information of a radio access network ("RAN") node of the wireless terminal; and
a processor configured to update the PDU session to the second requested network slice information.

* * * * *